United States Patent
Henderson et al.

(10) Patent No.: US 7,083,188 B2
(45) Date of Patent: Aug. 1, 2006

(54) TEARABLE RETENTION APPARATUS AND METHOD FOR AN AIRBAG CUSHION

(75) Inventors: David Henderson, North Ogden, UT (US); Brian A. Lighthall, Kaysville, UT (US)

(73) Assignee: Autoliv ASP, Inc., Ogden, UT (US)

( * ) Notice: Subject to any disclaimer, the term of this patent is extended or adjusted under 35 U.S.C. 154(b) by 277 days.

(21) Appl. No.: 10/712,242

(22) Filed: Nov. 13, 2003

(65) Prior Publication Data

US 2005/0104335 A1 May 19, 2005

(51) Int. Cl.
*B60R 21/16* (2006.01)

(52) U.S. Cl. ............................. 280/730.2; 280/728.2

(58) Field of Classification Search ............ 280/728.2, 280/730.2, 743.1, 730.1, 733
See application file for complete search history.

(56) References Cited

U.S. PATENT DOCUMENTS

| | | | |
|---|---|---|---|
| 5,794,971 A * | 8/1998 | Boydston et al. ............ | 280/733 |
| 6,045,151 A * | 4/2000 | Wu ........................... | 280/728.3 |
| 6,106,006 A * | 8/2000 | Bowers et al. ........... | 280/730.2 |
| 6,145,879 A | 11/2000 | Lowe et al. | |
| 6,481,744 B1 * | 11/2002 | Melia ....................... | 280/730.2 |
| 6,626,456 B1 | 9/2003 | Terbu et al. | |
| 6,883,827 B1 * | 4/2005 | Keshavaraj .............. | 280/730.2 |
| 2003/0188979 A1 | 10/2003 | Saderholm et al. | |

FOREIGN PATENT DOCUMENTS

GB 2 349 618 11/2000

* cited by examiner

*Primary Examiner*—Paul N. Dickson
*Assistant Examiner*—Drew J. Brown
(74) *Attorney, Agent, or Firm*—Sally J Brown

(57) ABSTRACT

An airbag module may include an inflator, a cushion, and a retention apparatus that keeps the cushion in a stowed configuration until deployment. The retention apparatus may include a flexible member wrapped around the cushion and a hook-and-loop fastening strip attached to the flexible member via a sewn seam. The hook-and-loop fastening strip has hooks fastened to the flexible member to secure the flexible member around the cushion. The sewn seam is weak enough to permit the hook-and-loop fastening strip to break away from the flexible member. When the cushion begins to inflate, the sewn seam breaks to allow the hook-and-loop fastening strip to separate from one side of the flexible member while remaining attached to the opposite side. The cushion is able to inflate through the corresponding opening formed in the retention apparatus. In alternative embodiments, the flexible member, fastener, and attachment mechanism may be reconfigured or omitted.

36 Claims, 6 Drawing Sheets

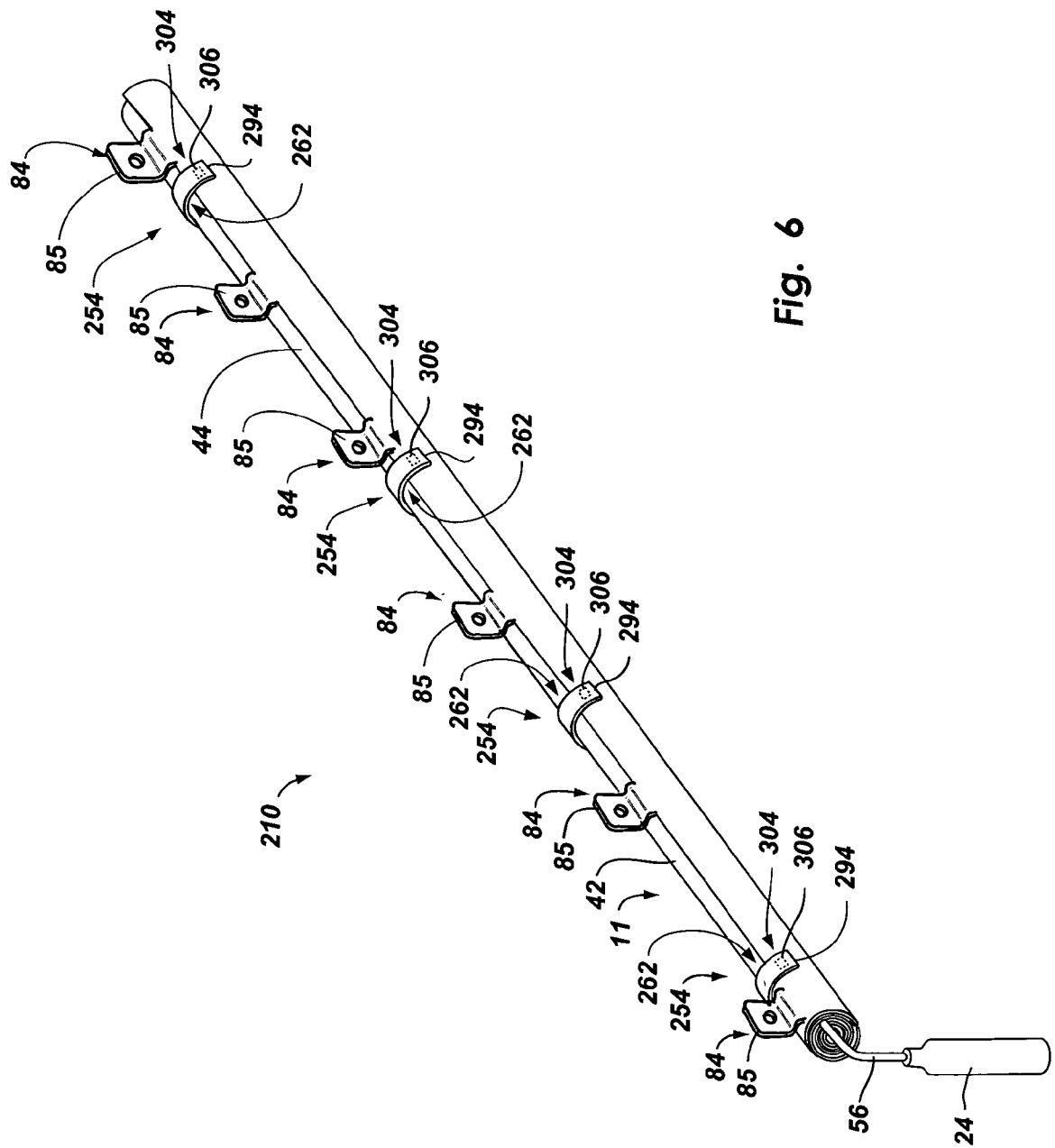

TEARABLE RETENTION APPARATUS AND METHOD FOR AN AIRBAG CUSHION

BACKGROUND OF THE INVENTION

1. Field of the Invention

The present invention relates to systems and methods for protecting vehicle occupants from injury. More specifically, the present invention relates to a retention apparatus for keeping an airbag cushion in a stowed configuration until deployment.

2. Description of Related Art

The inclusion of inflatable safety restraint devices, or airbags, is now a legal requirement for many new vehicles. Airbags are typically installed in the steering wheel and in the dashboard on the passenger side of a car. Additionally, airbags may be installed to inflate beside the passenger to provide side impact protection, in front of the knees to protect the knees from impact, or at other strategic locations.

In the event of an accident, a sensor system within the vehicle senses an impact situation and triggers the ignition of an inflator. Inflation gases from the inflator fill the airbag cushions, which immediately inflate to protect the driver and/or passengers from impact against the interior surfaces of the vehicle. During normal vehicle operation, airbags are typically stowed behind covers to protect them from tampering and provide a more attractive interior facade for the vehicle. A number of different airbag types are in use, including frontal driver's side and passenger's side airbags, inflatable curtains, overhead airbags, and knee bolsters.

Often, an airbag cushion is covered with a fabric or polymer wrap designed to keep the cushion folded until the time the cushion deploys. Such a wrap may facilitate installation of the cushion in a vehicle, and also ensure that the cushion remains properly folded to deploy in the intended manner. In the case of an inflatable curtain, the wrap may be an elongated, tubular design. Many known wraps have perforations designed to permit the wrap to tear to permit emergence of the inflating cushion.

Unfortunately, such perforations must generally be formed with considerable precision to ensure that the wrap is strong enough to remain intact during further fabrication, shipping, and installation, and yet weak enough at the perforation to permit the wrap tear during deployment. If the wrap does not tear properly along the perforation during deployment, the cushion may fail to inflate in the proper manner. Consequently, it is important that the geometry of the perforation be tightly controlled. As a result, the tolerances of the perforations tend to be relatively tight, and the perforations are difficult to form with economical techniques.

Furthermore, many known wrap designs are difficult to place around the cushion. Some wraps, particularly those designed for elongated cushions such as inflatable curtain cushions, present assembly challenges because the cushion must be inserted lengthwise into the wrap. In some instances, relatively elaborate or labor intensive methods must be used to align the cushion with the wrap and then pull the cushion into the wrap. Some wraps can be improperly assembled with the corresponding cushion.

The time required to form a perforated wrap and place the wrap around the cushion adds significantly to the time required to produce the airbag module. Furthermore, such challenges and/or disadvantages also add to the cost of the module, thereby decreasing the availability and use of such airbag modules.

SUMMARY OF THE INVENTION

The apparatus and method of the present invention have been developed in response to the present state of the art, and in particular, in response to the problems and needs in the art that have not yet been fully solved by currently available airbag modules. Thus, it is an overall objective of the present invention to provide an airbag module and associated methods that remedy the shortcomings of the prior art.

To achieve the foregoing objective, and in accordance with the invention as embodied and broadly described herein in one embodiment, an airbag module includes a cushion, an inflator, a gas guide, a retention apparatus. The cushion has a stowed configuration in which the cushion is compactly storable and a deployed configuration in which the cushion is inflated to provide lateral impact protection. The retention apparatus encircles the cushion in the stowed configuration and opens to permit expansion of the cushion into the deployed configuration.

The cushion is an "inflatable curtain," and thus inflates alongside a lateral surface of the vehicle to protect vehicle occupants against impact with the lateral surface. The cushion may have first and second protection zones that inflate beside front seat occupants and rear seat occupants, respectively. The cushion is attached to a roof rail of the vehicle via known attachment devices such as a bracket and a plurality of bolts. The inflator may be disposed rearward of the cushion, and may, for example, extend along a C pillar of the vehicle. The gas guide conveys inflation gas from the inflator to the cushion. The inflator may be electrically coupled to an electronic control unit, or ECU, that triggers deployment of the airbag module based on accelerometer data or the like.

The retention apparatus keeps the cushion in the stowed configuration until deployment. The retention apparatus includes a flexible member that encircles the cushion along substantially its entire longitudinal length. The flexible member is wrapped around the cushion so that first and second edges of the flexible member overlap each other. A fastener is attached to the flexible member proximate the first edge. In this embodiment, the fastener is a hook-and-loop fastening strip. The flexible member is formed of a fabric with a napped side and a non-napped side. The hook-and-loop fastening strip is attached to the non-napped side and is attachable to the napped side.

More precisely, the fastener is attached to the non-napped side via an attachment mechanism such as a sewn seam. The sewn seam has a strength selected such that the sewn seam breaks when a predetermined stress level is reached. The sewn seam breaks as the cushion begins to inflate so that the retention apparatus will open to release the cushion. The fastener fastens to the napped side via hook-and-loop engagement. More particularly, the napped side has loops engaged by extending hooks of the hook-and-loop fastening strip. The hook-and-loop fastening strip may remain fastened to the napped side when the cushion inflates.

The flexible member may have tabs defined by the formation of tab cutouts in the flexible member. Each of the tabs has a hole that engages a corresponding hook in the roof rail when the inflatable curtain module is installed. Additionally, the flexible member has slits along its length. The cushion has tabs distributed along its top edge; the tabs extend through the slits of the flexible member. Each of the tabs of the cushion also has a hole. The tabs of the cushion are attached to the roof rail via bolts or the like. The bolts may extend through holes of a metal bracket disposed inboard of the tabs of the cushion.

The inflatable curtain module may be assembled by, first compacting the cushion into the stowed configuration. For example, the cushion may be rolled. The cushion may be laid on top of the retention apparatus, and the cushion may be rolled along the surface of the retention apparatus, along with the second edge of the flexible member, until the hook-and-loop attachment member is fastened to the napped side.

The inflatable curtain module may be installed by attaching the tabs of the cushion to the roof rail via the bolts and/or brackets, and then disposing the hooks of the roof rail through the tabs of the retention apparatus. The tabs of the cushion provide primary attachment while the tabs of the retention apparatus draw the hanging cushion relatively snugly against the roof rail.

In operation, a collision is detected and the ECU transmits an activation signal to the inflator. The activation signal causes the inflator to deploy, thereby producing inflation gas. The inflation gas is conducted through the gas guide into the cushion. The cushion begins to expand and the resulting outward pressure on the flexible member causes the thread of the sewn seam to break, thereby permitting the hook-and-loop fastening strip to separate from the non-napped side of the flexible member. The hook-and-loop fastening strip remains fastened to the napped side of the flexible member. The cushion inflates through the resulting opening of the flexible member, and extends alongside the lateral surface of the vehicle to provide lateral impact protection.

According to one alternative embodiment, multiple retention apparatus are used to keep a cushion in the stowed configuration. The cushion may be configured in a manner similar to that of the previous embodiment. Each retention apparatus includes a flexible member in the form of a strap; the straps of the retention apparatus are distributed along the length of the cushion. Each of the straps has first and second edges that are coupled together via a corresponding fastener in the form of a clip. The clip has a base plate attached to the flexible member proximate the first edge and a hook fastenable proximate the second edge.

More precisely, each base plate is attached to the corresponding flexible member via an attachment mechanism in the form of an adhesive. Each hook is insertable through a hole formed proximate the second edge of the corresponding flexible member. The adhesive has an attachment strength selected to permit removal of the base plate from the flexible member in response to expansion of the cushion. The hooks may remain retained by the corresponding holes. Detachment of the base plates from the flexible members permits the flexible members to open so that the cushion can inflate.

Assembly of the inflatable curtain module is similar to that described above. More precisely, the cushion may be rolled, placed on top of each retention apparatus, and then rolled along with the first edges of each retention apparatus until the hooks are positioned to be inserted through the holes of the flexible members. The hooks are then inserted through the holes.

Installation of the inflatable curtain module may also be similar to that of the previous embodiment, except that each retention apparatus has no tabs to be attached to the roof rail. Deployment of the inflatable curtain module occurs in a manner similar to that described previously, in connection with the previous embodiment.

According to another alternative embodiment of the invention, an inflatable curtain module has a cushion similar to that described above. The cushion is kept in the stowed configuration by multiple retention apparatus, each of which includes a flexible member configured as a strap. Each of the flexible members has a first edge and a second edge. The flexible members are attached to the cushion proximate each of the first and second edges. The first and second edges are disposed on either side of the outwardly disposed edge of the rolled cushion so that the retention apparatus are able to keep the cushion in the stowed configuration.

The first edge is attached to the cushion in a permanent manner. The second edge is attached via an attachment mechanism with an attachment strength selected to permit breakage of the attachment mechanism in response to expansion of the cushion. Accordingly, when the cushion begins to inflate, the flexible member detaches from the cushion proximate the second edge to open each retention apparatus, thereby permitting inflation of the cushion. No fastener need be used.

The inflatable curtain may be assembled by, first, permanently attaching the flexible members to the cushion proximate the first edges. The flexible members are disposed to cross the exposed longitudinal edge of the cushion. Then, the flexible members may be removably attached to the cushion proximate the second edges via the attachment mechanism.

The inflatable curtain may be installed in the vehicle in a manner similar to that described in connection with the previous embodiment, i.e., by attaching the tabs of the cushion to the roof rail. Deployment of the inflatable curtain module is also similar to that of the previous embodiment, except that no fastener is present. Rather, the attachment mechanism directly permits separation of the flexible member from the cushion.

Through the use of airbag modules and associated methods of the present invention, airbag cushions may be inexpensively and securely retained in the stowed configuration in a manner that permits reliable deployment. These and other features and advantages of the present invention will become more fully apparent from the following description and appended claims, or may be learned by the practice of the invention as set forth hereinafter.

BRIEF DESCRIPTION OF THE DRAWINGS

In order that the manner in which the other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 6 is a perspective view of an airbag module according to another alternative embodiment of the invention.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 6, is not intended to limit the scope of the invention, as claimed, but is merely representative of presently preferred embodiments of the invention.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanism. The term "abutting" refers to items that are in direct physical contact with each other, although the items may not be attached together. The term "grip" refers to items that are in direct physical contact with each other, wherein one item holds the other firmly. The term "overlap" refers to items that are proximate to each other, wherein one extends over and covers a part of the other, but not necessarily in contact with each other.

Figure 1:
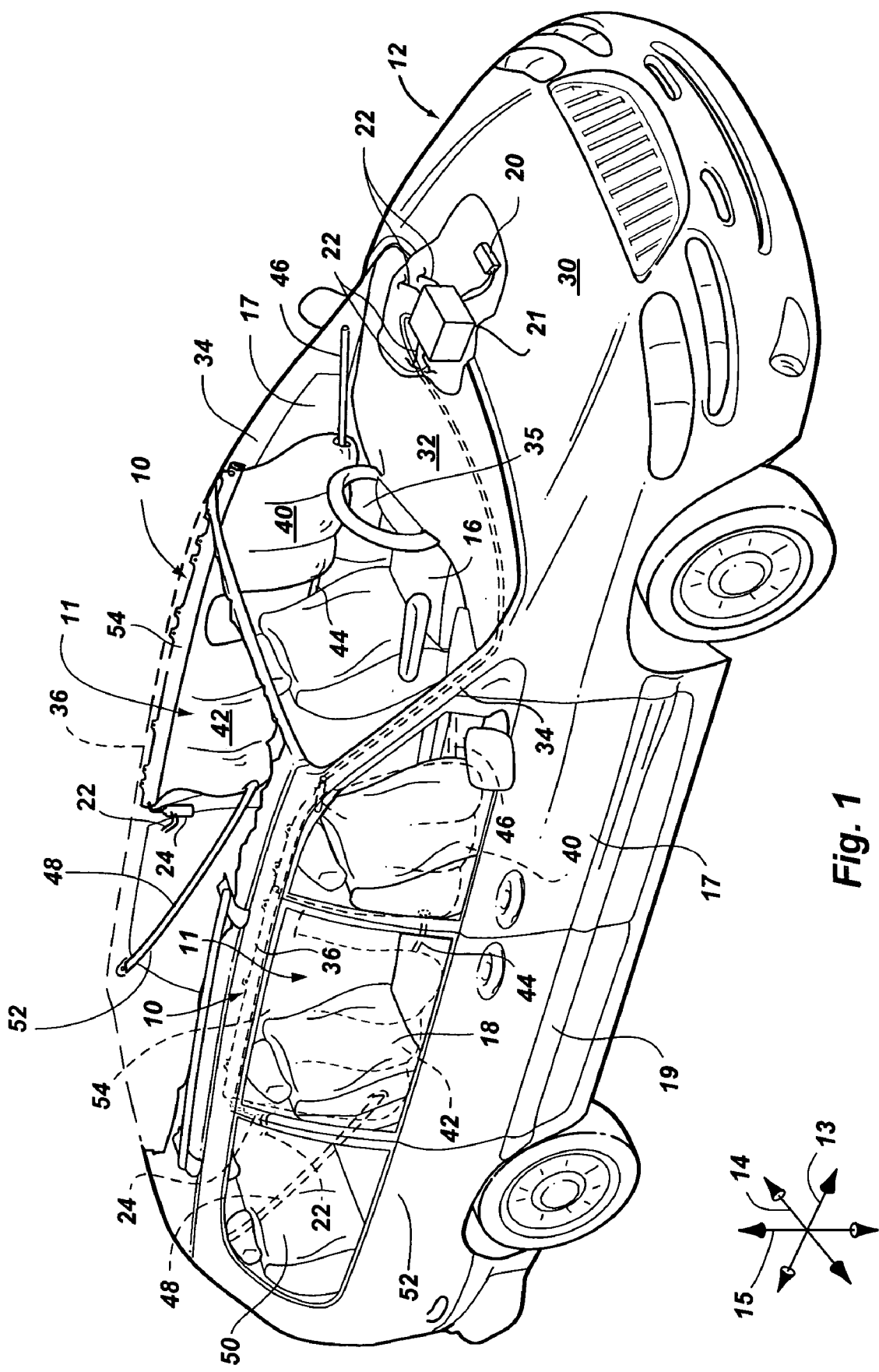
FIG. 1 is a perspective view of an airbag module according to one embodiment of the invention, installed in a vehicle and in the deployed configuration.

Referring to FIG. 1, a perspective view illustrates two inflatable curtain modules 10, or IC modules 10, according to one possible embodiment the invention. Each of the IC modules includes a cushion 11 designed to inflate to protect an occupant of a vehicle 12 in which the IC modules 10 are installed. Each of the cushions 11 has a stowed configuration in which the cushion 11 is compactly storable and a deployed configuration in which the cushion 11 is inflated to provide lateral impact protection. In FIG. 1, the cushions 11 are shown in the deployed configuration.

The IC modules 10 are designed to protect the occupant from lateral impact; however, the present invention applies to other types of airbag systems such as driver's and passenger's side front impact airbags, overhead airbags, and knee bolsters. Use of side impact airbags is purely exemplary.

The vehicle 12 has a longitudinal direction 13, a lateral direction 14, and a transverse direction 15. The vehicle 12 further has front seats 16 laterally displaced from first lateral surfaces 17, or front doors 17, as shown in the vehicle 12 of FIG. 1. The vehicle 12 also has rear seats 18 laterally displaced from second lateral surfaces 19, or rear doors 19, as depicted.

An accelerometer 20 or other similar impact sensing devices detect sudden lateral acceleration (or deceleration) of the vehicle 12. The accelerometer 20 is coupled to an electronic control unit, or ECU 21. The ECU 21 processes output from the accelerometer 20 and transmits electric signals via electric lines 22 to inflators 24 disposed to inflate each of the cushions 11. As shown, each of the inflators 24 is disposed rearward of the corresponding cushion 11, i.e., in a C pillar or similar structure of the vehicle 12. In alternative embodiments, a single inflator 24 may be coupled to both of the cushions 11 via gas guides or other structures in such a manner that the inflator 24 inflates both of the cushions 11.

Each of the inflators 24 is designed to produce inflation gas upon application of electricity to inflate the corresponding cushion 11. The inflators 24 may operate with such rapidity that, before the vehicle 12 has fully reacted to the impact, the cushions 11 have inflated to protect vehicle occupants from impact.

The accelerometer 20 and the ECU 21 may be disposed within an engine compartment 30 or dashboard 32 of the vehicle 12. In such a configuration, the electric lines 22 may be disposed along A pillars 34 of the vehicle 12 to convey electricity from the vicinity of the dashboard 32 upward, along the windshield 35, to the inflators 24. The accelerometer 20, ECU 21, and the inflators 24 need not be positioned as shown, but may be disposed at a variety of locations within the vehicle 12. The ECU 21 may include capacitors or other devices designed to provide a sudden, reliable burst of electrical energy.

Each of the cushions 11 is installed along one of the roof rails 36. The cushions 11 shown in FIG. 1 are configured to protect not only occupants of the front seats 16, but those of the rear seats 18 as well. Thus, each cushion 11 may have a first protection zone 40 configured to inflate between the front seats 16 and one of the front doors 17, and a second protection zone 42 configured to inflate between the rear seats 18 and one of the rear doors 19.

The first and second protection zones 40, 42 of each cushion 11 may be attached together through the use of a central tether 44 between the protection zones 40, 42. The central tethers 44 may be longitudinally positioned between the front seats 16 and the rear seats 18; consequently, the central tethers 44 may or may not be configured to provide impact protection for occupants of the vehicle 12. If desired, the central tethers 44 may be replaced by broader fabric sections and/or additional inflatable chambers (not shown).

The first protection zone 40 of each cushion 11 may be attached to the adjoining A pillar 34 via a front tether 46. Similarly, the second protection zone 42 of each cushion 11 may be attached to the rearward portion of the adjoining roof rail 36 via a rear tether 48. The front and rear tethers 46, 48 cooperate with the central tether 44 to provide a tension line across each cushion 11 to keep the cushions 11 in place during inflation and impact.

Although each cushion 11 in FIG. 1 has two protection zones 40, 42, the invention encompasses the use of cushions with any number of protection zones. Thus, if desired, the protection zones 42 and central tethers 44 may be omitted to leave only the protection zones 40. Alternatively, each of the cushions 11 may be extended to have one or more protection zones positioned to protect occupants of extra seats 50 behind the rear seats 18 from impact against third lateral surfaces 52 of the vehicle 12.

Figure 2:
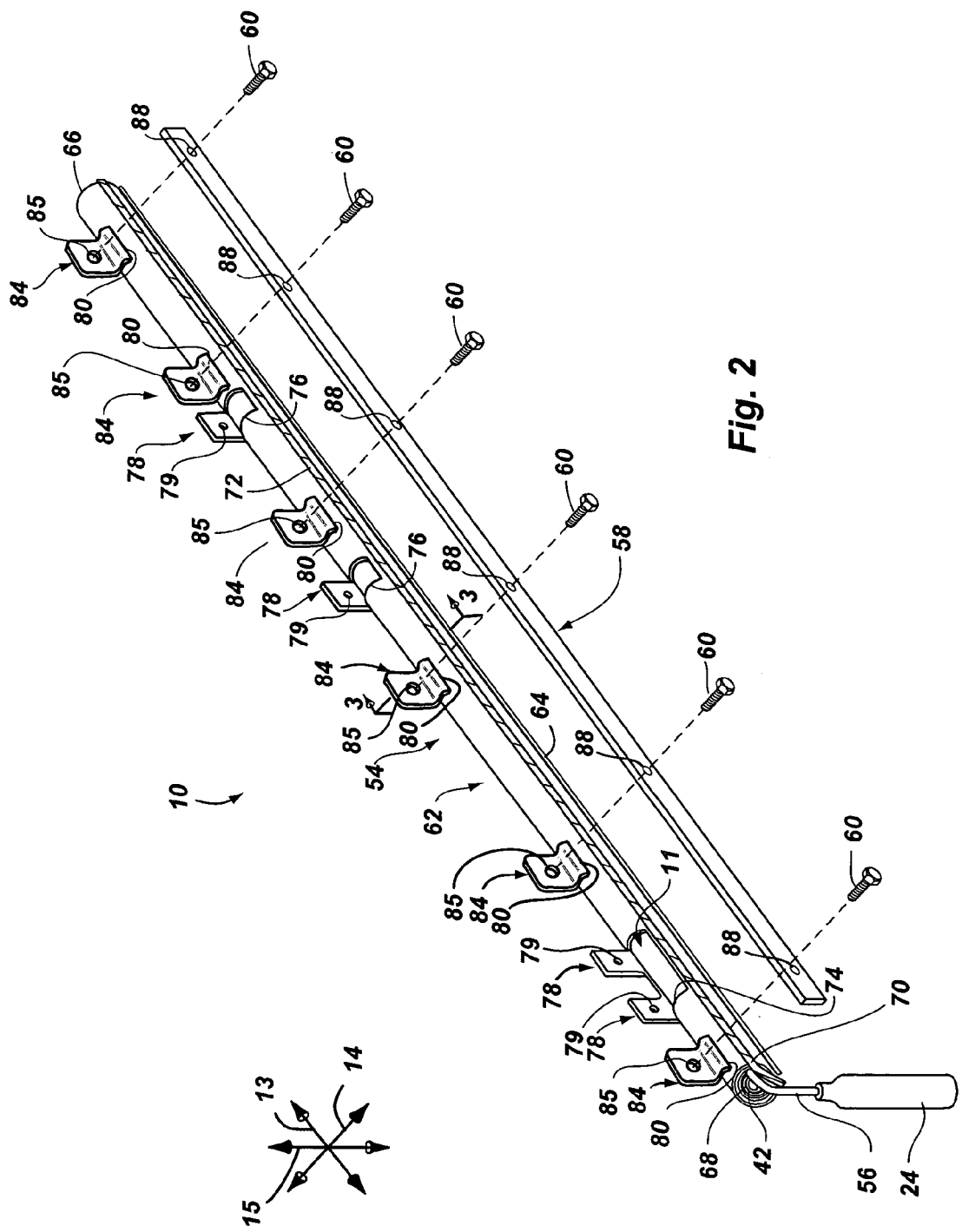
FIG. 2 is an exploded, perspective view of the airbag module of FIG. 1, in the stowed configuration.
Figure 3:
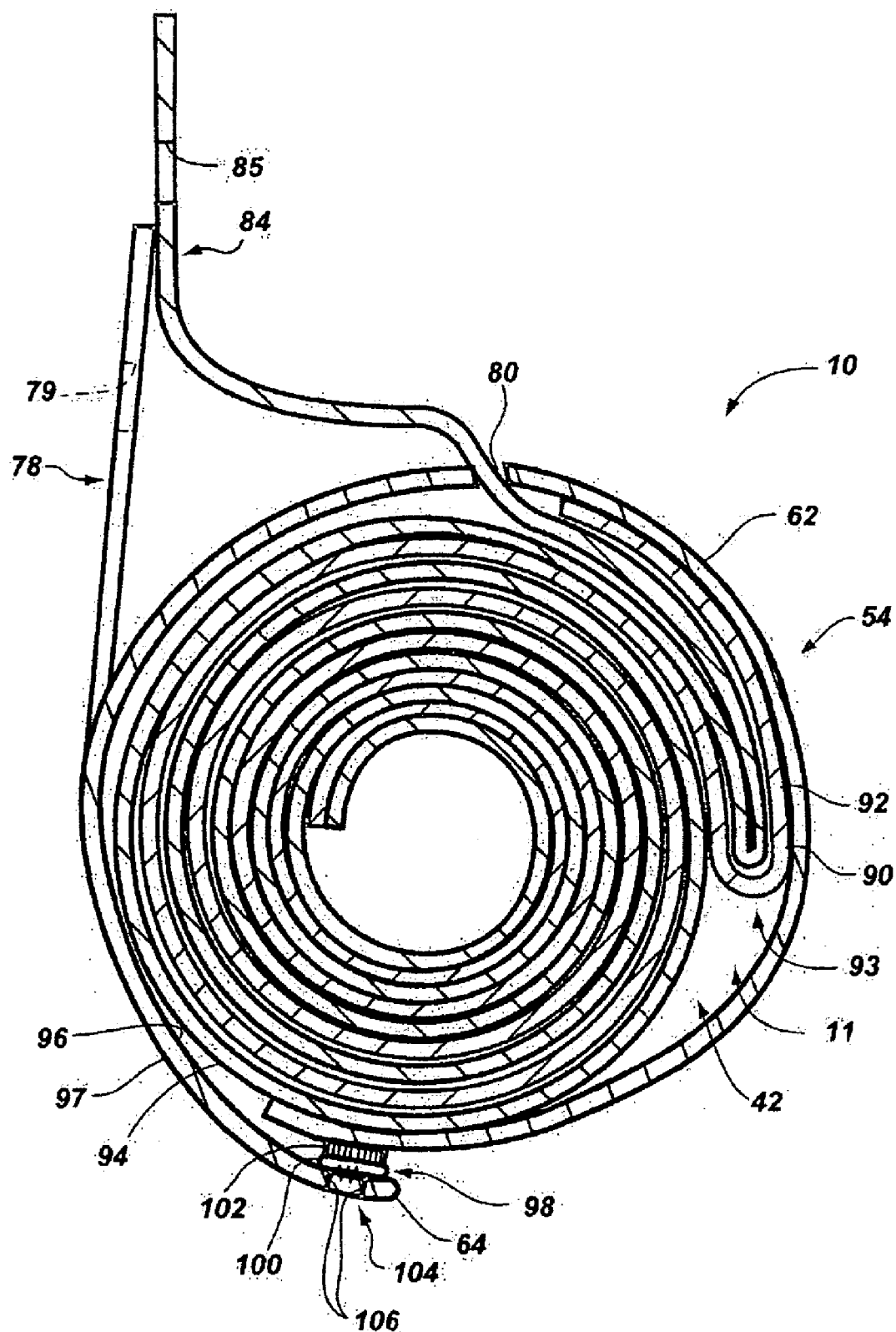
FIG. 3 is a rear elevation, section view of the cushion and the retention apparatus of the airbag module of FIG. 1, in the stowed configuration.
Figure 4:
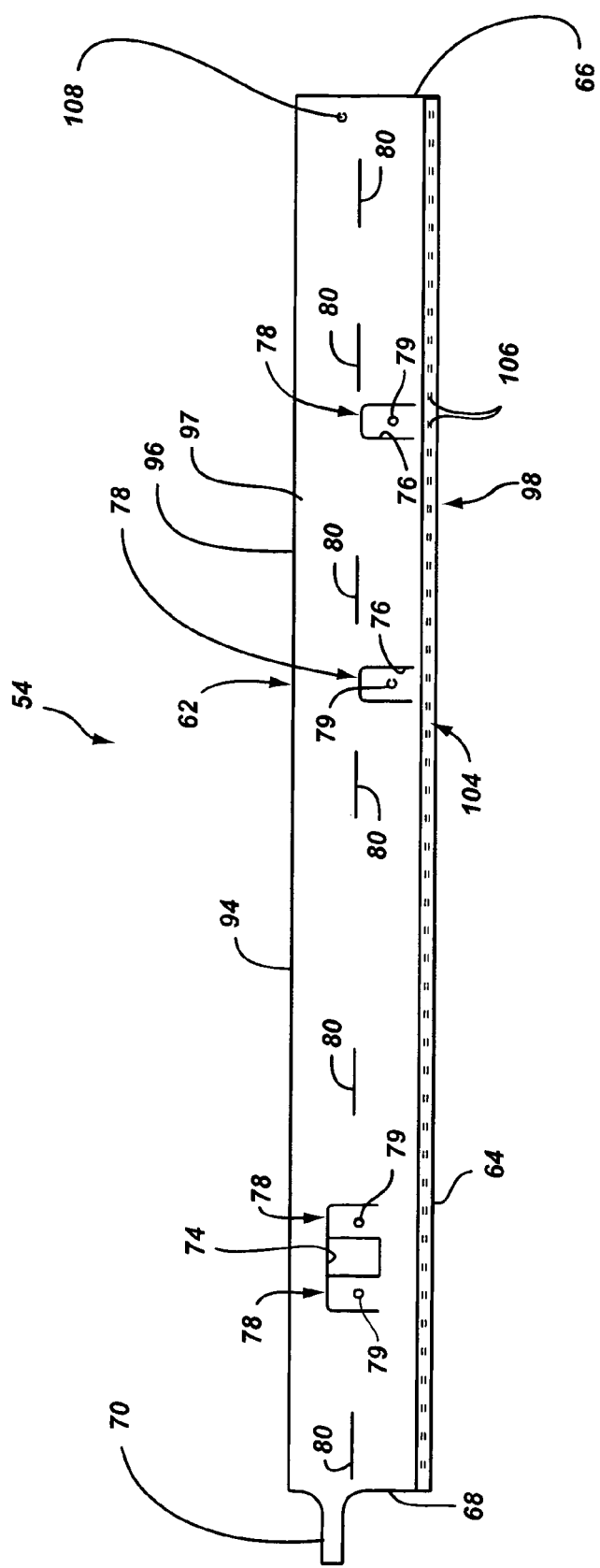
FIG. 4 is a plan view of the retention apparatus of the airbag module of FIG. 1, prior to assembly with the cushion.

Each of the IC modules 10 also includes a retention apparatus 54 designed to keep the associated cushion 11 in the stowed configuration until deployment. Each retention apparatus 54 may be a "wrap," i.e., a retention apparatus designed to wrap around the corresponding cushion 11, along its longitudinal length, to keep it in the stowed configuration. In alternative embodiments to be shown and/or described hereafter, a retention apparatus need not be a wrap, but may retain the cushion in the stowed configuration in other ways. Each retention apparatus 54 opens to permit inflation of the associated cushion 11. Thus, each retention apparatus 54 is shown open to permit cushion inflation. FIGS. 2 through 4 will set forth the configuration and operation of the left-handed (i.e., driver's side) retention apparatus 54 in greater detail.

Referring to FIG. 2, a perspective view illustrates one of the IC modules 10 of FIG. 1, i.e., the left-handed IC module 10, in greater detail. In addition to the cushion 11 and the retention apparatus 54, the IC module 10 includes a gas guide 56, a bracket 58, and a plurality of bolts 60. The front and rear tethers 46, 48 have been omitted for clarity, are also part of the IC module 10 and may be attached to the cushion 11 prior to assembly of the cushion 11 and the retention apparatus 54, if desired. The front and rear tethers 46, 48 may alternatively be coupled to the cushion 11 after the cushion 11 and the retention apparatus 54 have been assembled.

The gas guide 56 couples the inflator 24 to the rearward edge of the cushion 11 and conveys inflation gas from the inflator 24 to the interior of the cushion 11. The bracket 58 and the bolts 60 are used to attach the cushion 11 and the retention apparatus 54 to the corresponding roof rail 36 of the vehicle 12 in a manner that will be described in greater detail subsequently.

The retention apparatus 54 includes a flexible member 62 having a first edge 64, a second edge (not shown in FIG. 2), a leading edge 66, and a trailing edge 68. The retention apparatus 54 also has a rearward extension 70 that extends from the trailing edge 68 and along the adjoining portion of the gas guide 56. The rearward extension 70 may serve as an orientation feature that helps an installer or assembler ensure that the gas guide 56 is properly positioned with respect to the cushion 11. The rearward extension 70 may be attached to the gas guide 56, if desired.

The flexible member 62 also has a marker band 72 extending along the longitudinal direction 13. The marker band 72 is disposed inboard and indicates that the cushion 11 and the retention apparatus 54 are disposed at the proper orientation so that the cushion 11 will inflate generally parallel to the lateral surfaces 17, 19 to provide proper lateral impact protection. Text (not shown) may also be disposed on the flexible member 62, proximate the marker band 72 to display the model of the IC module 10, the side to which the IC module 10 is to be installed, and/or any other information that could be helpful to assemblers, installers, or repair personnel.

The flexible member 62 also has tab cutouts 74 and 76 from which a plurality of tabs 78 are cut on three sides from the material of the flexible member 62. As shown, the cushion 11 is visible through the tab cutouts 74, 76. The tabs 78 extend upward, and each of the tabs 78 has a hole 79. The tabs 78 may be attached to hooks (not shown) of the corresponding roof rail 36 to help secure the retention apparatus 54 and the cushion 11 in a manner that will be described in greater detail subsequently.

The flexible member 62 has a plurality of slits 80 arranged longitudinally along its length. The cushion 11 has a plurality of tabs 84 disposed at its upper edge. Each of the tabs 84 extends through one of the slits 80 of the flexible member 62. Each of the tabs 84 has a hole 85 that permits attachment of the tab 84 to the roof rail 36 via a corresponding bolt 60. More precisely, the bracket 58 has a plurality of holes 88, each of which is aligned with one of the holes 85 of the tabs 84 of the cushion 11. Each of the bolts 60 extends through a hole 88 of the bracket 58, through a hole 85 of one of the tabs 84, and through a corresponding hole (not shown) formed in the roof rail 36.

The tabs 84, bracket 58, and bolts 60 represent only one method of attaching the cushion 11 to the roof rail 36; many other known attachment methods may be used. For example resilient clips, clamps, hooks, rivets, or the like may be used.

Returning to the embodiment of FIG. 2, the tabs 84 of the cushion 11 provide primary attachment of the cushion 11 and the retention apparatus 54 to the vehicle 12. The tabs 78 of the flexible member 62 provide secondary attachment to the vehicle 12. More precisely, the roof rail 36 may provide a surface that is angled downward somewhat; the tabs 78 are attached to hooks (not shown) of the roof rail 36 to snug the cushion 11 and the retention apparatus 54 against the roof rail 36, thereby preventing the cushion 11 and the retention apparatus 54 from swinging in the lateral direction 14.

Referring to FIG. 3, a rear elevation, section view illustrates the cushion 11 and the retention apparatus 54 of FIGS. 1 and 2. As shown, the cushion 11 has a first panel 90 and a second panel 92. The first and second panels 90, 92 may be expanses of fabric cut to the desired shape from bulk material via laser cutting or the like. The first and second panels 90, 92 are then aligned and laid one on top of the other, and attached together via techniques such as sewing, RF welding, adhesive bonding, or one piece weaving. The result is the formation of the first and second protection zones 40, 42, which have a gas retention capability sufficient to cause the cushion 11 to remain inflated during protracted collision events, such as vehicle rollovers.

The tabs 84 may be formed in only the second panel 92, as shown, or alternatively, in both the first and second panels 90, 92. The cushion 11 may be folded in a manner that promotes downward inflation. Accordingly, the cushion 11 may extend forward and downward from the tabs 84, and may be folded back on itself to form a bend 93. The cushion 11 may be rolled inward of the bend. In alternative embodiments, the cushion 11 may be Z-folded, chaos folded, or compacted in ways other than that illustrated in FIG. 3.

As mentioned previously, the flexible member 62 has a second edge 94. The flexible member 62 extends around the entire circumference of the cushion 11 so that the first and second edges 64, 94 overlap each other. The flexible member 62 may be formed of a nonwoven fabric material formed of a polymer such as polypropylene. For example, the flexible member 62 may be made of a fabric such as a NOLAR fabric. The flexible member 62 may have a napped side 96 on which loops of the material are accessible, and an opposite side, e.g., a non-napped side 97 with a comparatively smoother texture.

As shown, the napped side 96 is exposed and the non-napped side 97 faces inward against the cushion 11. In alternative embodiments, the flexible member 62 need not have a napped side and a non-napped side, but may have only a narrow napped portion, two full napped sides, or any other configuration that permits removable attachment of the flexible member 62 to the cushion.

In addition to the flexible member 62, the retention apparatus 54 includes a fastener designed to secure the flexible member 62 around the cushion 11. In the embodiment of FIG. 3, the fastener comprises a hook-and-loop fastening strip 98, which forms the hook component of a hook-and-loop attachment system such as VELCRO. The napped side 96 of the flexible member 62 forms the loop component. The hook-and-loop fastening strip 98 includes a base 100 and a plurality of hooks 102 that extend from the base 100. The base 100 may be constructed of a fabric, a solid polymer, or the like.

The hook-and-loop fastening strip 98 may be designed to provide relatively strong engagement with the napped side 96 of the flexible member 62 so that the hooks 102 will reliably remain attached to the flexible member 62 when the cushion 11 inflates. The hooks 102 may be of a comparatively long type to provide secure engagement. According to one embodiment, the hook-and-loop fastening strip 98 may be of 224 grade material available from Aplix, Inc.

By contrast, the base 100 is attached to the non-napped side 97 in such a manner that the base 100 is able to detach from the non-napped side 97 to open the retention apparatus 54 and permit emergence of the inflating cushion 11. More specifically, the base 100 is attached to the non-napped side 97 via an attachment mechanism with an attachment strength low enough to permit the base 100 to break away from the non-napped side 97 during deployment. In this application, "attachment strength" refers to the maximum stress an attachment mechanism can withstand before permitting detachment of the attached articles.

In the embodiment of FIG. 3, the attachment mechanism takes the form of a sewn seam 104, which consists of thread 106 sewn through the base 100 and the adjacent portion of the flexible member 62. The thread 106 has a thickness and pattern selected such that the thread 106 is breakable to provide the desired attachment strength. According to one example, the thread 106 may be a T-16 thread applied in double needle lock fashion. Different threads or patterns may be used if desired. Alternatively, the thread 106 may be designed to remain intact during deployment, and may be applied in such a manner that portions of the cushion 11 and/or the base 100 tear through during deployment to release the thread 106, thereby permitting breakage of the sewn seam 104.

It may be said that the flexible member 62 is "attached" to the cushion 11 even though no attachment mechanism is applied directly between the flexible member 62 and the cushion. The flexible member 62 is held in place with respect to the cushion 11 by virtue of attachment to itself via the hook-and-loop fastening strip 98 and the sewn seam 104. Thus, "attachment" to a cushion includes indirect as well as direct forms of attachment.

With brief reference again to FIG. 2 in conjunction with FIG. 3, the deployment of the IC module 10 will be described. The accelerometer 20 detects acceleration (or deceleration) corresponding to a collision event and transmits corresponding signals to the ECU 21. The ECU 21 transmits an activation signal to the inflator 24, and the inflator 24 produces inflation gas. The inflation gas moves through the gas guide 56 and enters the interior of the second protection zone 42 of the cushion 11. The gas guide 56 fills the second protection zone 42 and moves forward into the first protection zone 40 to fill the first protection zone.

The cushion 11 begins to expand, thereby putting pressure on the retention apparatus 54. The pressure builds to a threshold level, at which the thread 106 breaks to permit the base 100 of the hook-and-loop fastening strip 98 to break away from the non-napped side 97 of the flexible member 62. The hooks 102 remain attached to the napped side 96 as the flexible member 62 opens to release the inflating cushion 11. The cushion 11 inflates downward until it reaches the configuration illustrated in FIG. 1, thereby completing the deployment process.

Referring to FIG. 4, a plan view illustrates the retention apparatus 54 of FIGS. 1, 2, and 3, prior to assembly with the cushion 11. FIG. 4 illustrates the non-napped side 97; thus, the marker band 72 is not shown and the hook-and-loop fastening strip is visible. The retention apparatus 54 may have an alignment hole 108 that serves as a manufacturing aid for forming the shape of the flexible member 62.

The retention apparatus 54 may be assembled with the cushion 11 in a variety of ways. According to one example, the cushion 11 is first disposed in the stowed configuration, for example, by rolling the cushion 11 and forming the bend 93 in the manner illustrated in FIG. 3. The retention apparatus 54 is laid flat on a hard, flat surface, with the napped side 96 facing downward. The cushion 11 is placed on the non-napped side 97 and the second edge 94 of the flexible member 62 is held against the cushion 11 while the cushion 11 is rolled toward the first edge 64. The second edge 94 is also rolled with the cushion 11 until the portion of the napped side 96 adjacent to the second edge 94 is pressed against the hook-and-loop fastening strip 98, as shown in FIG. 3. The cushion 11 and the retention apparatus 54 are then disposed as shown in FIGS. 2 and 3.

As mentioned previously, the front and rear tethers 46, 48 may be attached to the cushion 11 prior to assembly of the cushion 11 with the retention apparatus 54, or after the retention apparatus 54 has been attached to the cushion 11. In any case, the cushion 11 and the retention apparatus 54 may then be installed in the vehicle. As mentioned previously, the bracket 58 and the bolts 60 are used to attach the tabs 84 of the cushion 11 to the roof rail 36, and the tabs 78 are attached to the hooks of the roof rail 36. The front and rear tethers 46, 48 are attached to the A pillar 34 and the rearward portion of the roof rail 36, respectively. The cushion 11 is connected to the inflator 24 via the gas guide 56, and the inflator 24 is installed in the C pillar. The accelerometer 20 and the ECU 21 are installed and connected to the inflator 24.

The IC module 10 of FIG. 1–4 is only one example of an airbag module according to the invention. As mentioned previously, the present invention applies to a variety of cushion types, and not just to inflatable curtains.

According to one alternative embodiment, a plurality of retention apparatus may be distributed along the length of an elongated cushion like the cushion 11. Each retention apparatus may have a longitudinal length shorter than that of the retention apparatus 11, so that the retention apparatus do not overlap each other, but instead are separated by regions of exposed cushion. Each retention apparatus may have a flexible member, a fastener such as a hook-and-loop attachment strip, and an attachment member such as a breakable sewn seam used to attach the fastener to the flexible member. Each retention apparatus may thus comprise a longitudinally shortened version of the retention apparatus 54 of FIGS. 1–4.

In alternative embodiments, different types of fasteners and/or attachment mechanisms may be used to keep the cushion in the stowed configuration. For example, in place of the hook-and-loop fastening strip, fasteners such as adhesives, clips, clamps, rivets, sewn seams, or the like may be used. In place of the sewn seam, attachment mechanisms such as hook-and-loop fastening members, adhesives, clips, clamps rivets, sewn seams, or the like may be used.

In this application, the "attachment mechanism" of a retention apparatus is generally a mechanism that keeps an airbag cushion in the stowed configuration with an attachment strength low enough to permit separation during deployment. The "fastener" of a retention apparatus is optional and is a mechanism coupled to a flexible member, a cushion, or the like via an attachment mechanism to keep the cushion in the stowed configuration. The fastener may have an attachment strength selected such that the fastener remains fastened even while the attachment mechanism breaks. The fastener is optional because in certain embodiments, a flexible member or a cushion may be directly attached via an attachment mechanism.

In this application, a "flexible member" may be a fabric, thin polymer sheet, or some other pliable structure that can conform to the exposed surface of a compacted airbag cushion. The flexible member is also optional because an attachment mechanism and, optionally, a fastener, may be used to attach the cushion to itself.

In one embodiment, the flexible member may be omitted and a fastener and/or attachment mechanism may be used to directly attach the cushion to itself to keep the cushion in the stowed configuration. For example, a hook-and-loop attachment strip may be attached along the longitudinal length of a cushion via a sewn seam, and the cushion may be folded in such a manner that the hooks of the hook-and-loop attachment strip directly engage the material of the cushion. When the cushion begins to inflate, the sewn seam breaks to permit the cushion to unfold. The hooks of the hook-and-loop attachment strip remain fastened to the cushion.

With the aid of the above disclosure, a person of skill in the art may construct a wide variety of additional embodiments of the invention. Exemplary alternative embodiments will be shown and described with reference to FIGS. 5 and 6.

Figure 5:
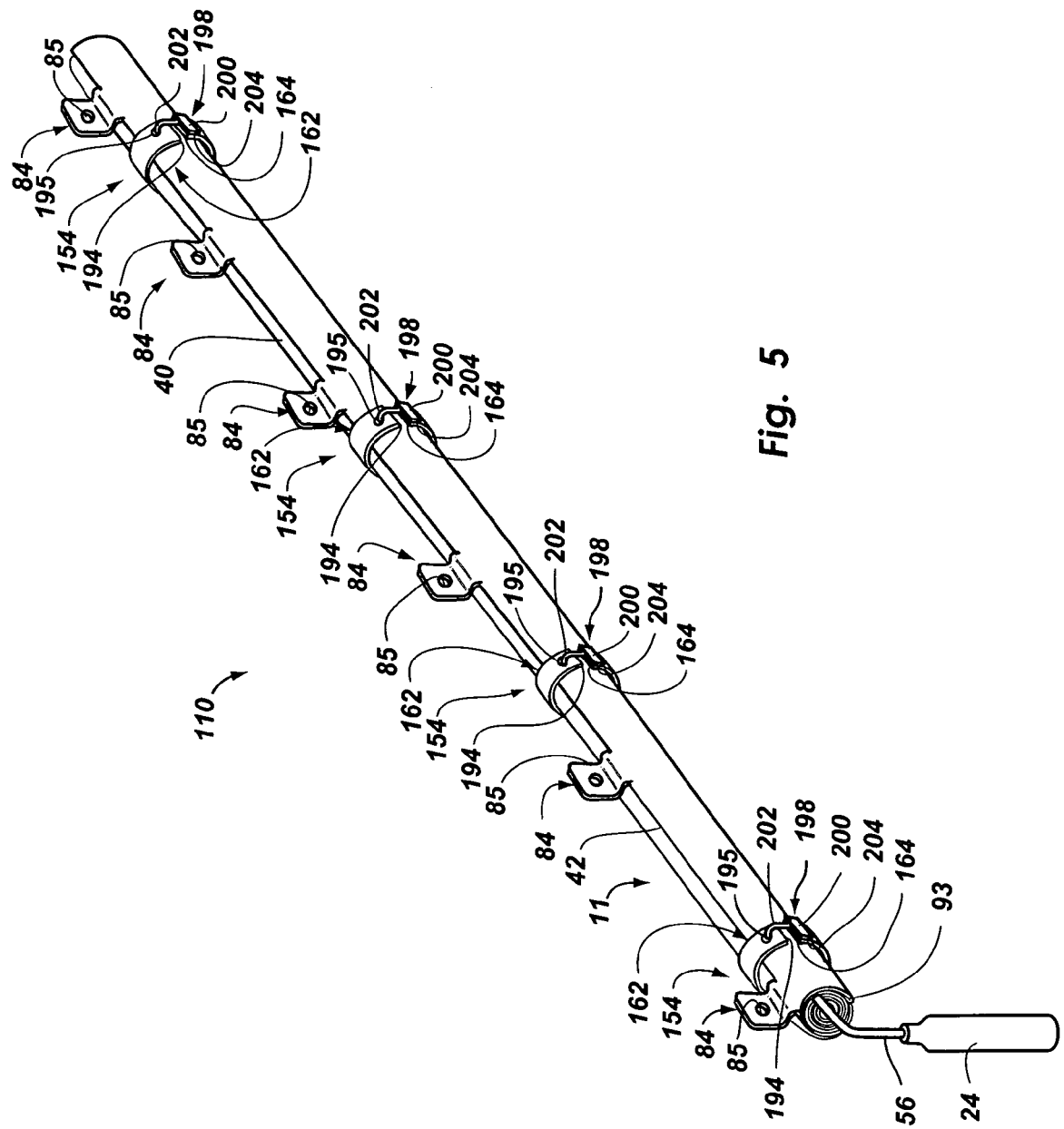
FIG. 5 is a perspective view of an airbag module according to one alternative embodiment of the invention.

Referring to FIG. 5, a perspective view illustrates an inflatable curtain module 110, or IC module 110, according to another alternative embodiment of the invention. As shown, the IC module includes a cushion 11 like that of the previous embodiment and a plurality of retention apparatus 154, each of which is configured differently from the retention apparatus 54 described above. Tethers, an inflator, a gas guide, and/or other components may also be included in the IC module 110 but are not shown in FIG. 5 for clarity.

As shown, each retention apparatus 154 has a comparatively small longitudinal dimension. The retention apparatus 154 are distributed along the longitudinal length of the cushion 11 so that they can cooperate to keep the cushion 11 in the stowed configuration. Each retention apparatus 154 has a flexible member 162 that has a small longitudinal dimension, and may thus be termed a "strap." Each of the flexible members 162 has a first edge 164 and a second edge 194. The flexible members 162 are wrapped around the cushion 11 such that the first and second edges 164, 194 are adjacent to each other. Each of the flexible members 162 is attached to itself proximate the first and second edges 164, 194.

More precisely, each flexible member 162 has a hole 195 disposed proximate the second edge 194. Each retention apparatus 154 also has a fastener in the form of a clip 198 that attaches the first edge 164 to the second edge 194. Each of the clips 198 has a base plate 200 and a hook 202 extending from the base plate 200. The base plate 200 and the associated hook 202 may be integrally formed of a material such as a plastic. Each clip 198 may be attached to the corresponding flexible member 162 proximate the first edge 164 via an attachment mechanism consisting of an adhesive 204. The adhesive 204 may be formed of plastic cement or the like. Each clip is fastened to the flexible member 162 proximate the second edge 194 via insertion of the hook 202 through the corresponding hole 195.

Each of the adhesives 204 has an attachment strength selected to permit the associated base plate 200 to break away from the corresponding flexible member 162 when the cushion 11 begins to expand. The hooks 202 may remain disposed in the holes 195 when the cushion 11 deploys. When the base plates 200 break away from the flexible members 162, the first and second edges 164, 194 of each flexible member 162 are able to separate to permit the cushion 11 to expand downward, between the first and second edges 164, 194. The deployment of the IC module 110 may otherwise be similar to that of the previous embodiment.

The IC module 110 may be assembled in a manner somewhat similar to that of the previous embodiment. For example, each retention apparatus 154 may first be laid flat on a hard, flat surface and aligned, with the base plates 200 of the clips 198 facing downward. The cushion 11 may be compacted, for example, by rolling, as shown, and laid on top of the retention apparatus 154. The clips 198 may be held against the cushion 11 and rolled toward the second edges 194 along with the cushion 11. The hooks 202 of the clips 198 may then be inserted through the holes 195 of the flexible members 162 to secure the flexible members 162 around the cushion 11. Installation of an inflator, tethers, and the like may be substantially as described above, in connection with the previous embodiment.

Referring to FIG. 6, a perspective view illustrates an inflatable curtain module 210, or IC module 210, according to another alternative embodiment of the invention. Tethers, an inflator, a gas guide, and/or other elements may also be included in the IC module 210 but are not shown in FIG. 6 for clarity. As shown, the IC module 210 includes a cushion 11 like those of the previous embodiments and multiple retention apparatus 254 that keep the cushion 11 in the stowed configuration. As in the previous embodiment, the retention apparatus 254 are distributed along the longitudinal length of the cushion 11.

As shown, each retention apparatus 254 includes a flexible member 262. As in the previous embodiment, each of the flexible members 262 has a comparatively small longitudinal dimension so that the flexible members 262 may be termed "straps." Unlike those of the previous embodiment, the flexible members 262 do not nearly fully encircle the cushion 11, but rather, simply cross the exposed edge (i.e., the upper edge) of the cushion 11. Each of the flexible members 262 has a first edge (not shown) and a second edge 294.

Each of the flexible members 262 is attached, proximate the first edge, to the cushion 11 in a permanent manner (not shown). Sewing with a relatively strong thread or stitching pattern, RF welding, adhesive bonding, or the like may be used. Each of the flexible members 262 is also attached, proximate the second end 294, in a manner that provides an attachment strength weak enough to permit the flexible member 262 to break away from the cushion 11 proximate the second end 294.

More precisely, an attachment mechanism comprising an adhesive 304 is used to directly attach the flexible member 262, proximate the second edge 294, to the cushion 11. Like the sewn seam 104, the adhesive 304 is formed by a thread 306 designed to break when a predetermined stress is reached. Since the thread 306 is applied over a comparatively small area, the thread 306 and/or the sewing pattern applied may need to have a comparatively higher strength per unit area than the thread 106 and its corresponding sewing pattern. Alternatively, the thread 306 may be applied in such a manner that the thread does not break, but the fabric of the cushion 11 and/or the fabric of the flexible member 262 breaks to release he thread 306, thereby permitting breakage of the adhesive 304.

As described above, no fastener need be applied; rather, a breakable attachment mechanism may be applied directly between a flexible member and a cushion. As described previously, the flexible member could also be omitted. In yet other alternative embodiments, the flexible member and the fastener may both be omitted so that the retention apparatus only includes an attachment mechanism. For example, an attachment mechanism such as a tearable sewn seam or the like may be applied directly between portions of the cushion that face each other when the cushion is in the stowed configuration. The attachment mechanism then breaks in response to expansion of the cushion to permit the cushion to inflate.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An airbag module for protecting an occupant of a vehicle from impact, the airbag module comprising:
   a cushion comprising a deployed configuration in which the cushion is inflated to provide impact protection and a stowed configuration in which the cushion is compactly storable; and
   a retention apparatus comprising a flexible member and a fastener attachable to the flexible member via an attachment mechanism such that the fastener is fastenable to attach the retention apparatus to the cushion to keep the cushion in the stowed configuration, wherein the attachment mechanism has an attachment strength selected to permit removal of the fastener from the flexible member to permit inflation of the cushion to the deployed configuration, wherein the attachment mechanism comprises a sewn seam formed of a thread having a strength selected to permit breakage of the thread in response to entry of gas into the cushion.

2. The airbag module of claim 1, wherein the cushion comprises an inflatable curtain designed to provide lateral impact protection.

3. The airbag module of claim 2, wherein the cushion is elongated in the stowed configuration and has a longitudinal axis at least partially encircled by the retention apparatus to facilitate installation of the cushion in a generally horizontal orientation within the vehicle.

4. The airbag module of claim 3, wherein the cushion is rolled in the stowed configuration.

5. The airbag module of claim 3, wherein the retention apparatus extends along substantially the entire longitudinal length of the cushion.

6. The airbag module of claim 3, further comprising at least one additional retention apparatus, each of which comprises an additional flexible member and an additional fastener attachable to the additional flexible member via an additional attachment mechanism such that the additional fastener is fastenable to attach the additional retention apparatus to the cushion to keep the cushion in the stowed configuration, wherein all of the retention apparatus are distributed along the longitudinal length of the cushion.

7. The airbag module of claim 1, wherein the fastener comprises a hook-and-loop fastening strip.

8. The airbag module of claim 7, wherein the flexible member is constructed of a fabric having a napped side and a non-napped side, wherein the hook-and-loop fastening strip is attached to the non-napped side so that the flexible member can be rolled to fasten the hook-and-loop fastening strip to the napped side.

9. The airbag module of claim 8, wherein the flexible member is constructed of a non-woven polypropylene fabric.

10. The airbag module of claim 1, wherein the thread comprises a T-16 size, wherein the thread is applied in double needle lock fashion along the fastener.

11. A retention apparatus for retaining a cushion of an airbag module for protecting an occupant of a vehicle from impact, the retention apparatus comprising:
   a flexible member;
   an attachment mechanism; and
   a fastener attached to the flexible member via the attachment mechanism;
   wherein the fastener is fastenable to attach the retention apparatus to a cushion of the airbag module to keep the cushion in a stowed configuration in which the cushion is compactly storable;
   wherein the attachment mechanism has an attachment strength selected to permit removal of the fastener from the flexible member to permit inflation of the cushion to a deployed configuration in which the cushion is inflated to provide impact protection, wherein the attachment mechanism comprises a sewn seam formed of a thread having a strength selected to permit breakage of the thread in response to entry of gas into the cushion.

12. The retention apparatus of claim 11, wherein the cushion comprises an inflatable curtain designed to provide lateral impact protection, wherein the cushion is elongated in the stowed configuration and the retention apparatus is sized to encircle a longitudinal axis of the cushion to facilitate installation of the cushion in a generally horizontal orientation within the vehicle.

13. The retention apparatus of claim 11, wherein the fastener comprises a hook-and-loop fastening strip.

14. The retention apparatus of claim 13, wherein the flexible member is constructed of a fabric having a napped side and an opposite side, wherein the hook-and-loop fastening strip is attached to the opposite side so that the flexible member can be rolled to fasten the hook-and-loop fastening strip to the napped side.

15. An attachment assembly for a retention apparatus designed to keep a cushion in a stowed configuration in which the cushion is compactly storable, the retention apparatus comprising a flexible member, the attachment assembly comprising:
   a hook-and-loop fastening strip; and
   an attachment mechanism usable to attach the hook-and-loop fastening strip to the flexible member, the attachment mechanism having an attachment strength selected to permit separation of the hook-and-loop fastening strip from the flexible member to permit inflation of the cushion to a deployed configuration in which the cushion is inflated to provide impact protection, wherein the attachment mechanism comprises a sewn seam formed of a thread having a strength selected to permit breakage of the thread in response to entry of gas into the cushion.

16. The attachment assembly of claim 15, wherein the cushion comprises an inflatable curtain designed to provide lateral impact protection, wherein the hook-and-loop fastening strip comprises an elongated shape extending substantially along a longitudinal length of the cushion to attach the retention apparatus to the cushion substantially along the longitudinal length.

17. The attachment assembly of claim 15, wherein the flexible member is constructed of a fabric having a napped side and an opposite side, wherein the hook-and-loop fastening strip is attached to the opposite side via the attachment mechanism so that the flexible member can be rolled to fasten the hook-and-loop fastening strip to the napped side.

18. The attachment assembly of claim 15, wherein the thread comprises a T-16 size, wherein the thread is applied in double needle lock fashion along the fastener.

19. An airbag module for protecting an occupant of a vehicle from impact, the airbag module comprising:
a cushion comprising a deployed configuration in which the cushion is inflated to provide impact protection and a stowed configuration in which the cushion is compactly storable;
a fastener fastenable to keep the cushion in the stowed configuration; and
an attachment mechanism usable to couple the fastener to the cushion independently of fastening of the fastener, wherein the attachment mechanism has an attachment strength selected to permit decoupling of the fastener from the cushion to permit inflation of the cushion to the deployed configuration, wherein the attachment mechanism comprises a sewn seam formed of a thread having a strength selected to permit breakage of the thread in response to entry of gas into the cushion.

20. The airbag module of claim 19, wherein the fastener is attached to a flexible member by the attachment mechanism to form a retention apparatus at least partially encircling the cushion to keep the cushion in the stowed configuration.

21. The airbag module of claim 20, further comprising at least one additional fastener attached to at least one additional flexible member by at least one additional attachment mechanism to form at least one additional retention apparatus at least partially encircling the cushion to keep the cushion in the stowed configuration, wherein all of the retention apparatus are distributed along a longitudinal length of the cushion.

22. The airbag module of claim 20, wherein the fastener is fastenable to the retention apparatus such that the retention apparatus fully encircles at least a portion of the cushion.

23. The airbag module of claim 20, wherein the fastener comprises a hook-and-loop fastening strip fastenable to the retention apparatus, wherein the flexible member is constructed of a fabric having a napped side and an opposite side, wherein the hook-and-loop fastening strip is attached to the opposite side so that the flexible member can be rolled to fasten the hook-and loop fastening strip to the napped side.

24. A method for providing impact protection for an occupant of a vehicle through the use of an airbag module, the airbag module comprising a cushion having a deployed configuration in which the cushion is inflated to provide impact protection and a stowed configuration in which the cushion is compactly storable, and a retention apparatus comprising a flexible member and a fastener attached to the flexible member, wherein the fastener is fastened to attach the retention apparatus to the cushion to keep the cushion in the stowed configuration during normal vehicle operation, the method comprising:

receiving inflation gas into the cushion to induce inflation of the cushion from the stowed configuration; and
releasing the fastener from attachment with the flexible member to permit opening of the retention apparatus to permit inflation of the cushion into the deployed configuration, wherein the fastener is attached to the flexible member via an attachment mechanism comprises sewing the retention apparatus to form a sewn seam with a thread having a strength selected to permit breakage of the thread in response to entry of gas into the cushion.

25. The method of claim 24, wherein the cushion comprises an inflatable curtain, wherein opening the retention apparatus to permit inflation of the cushion into the deployed configuration comprises permitting inflation of the cushion beside the occupant to provide lateral impact protection.

26. The method of claim 25, wherein the cushion is rolled in the stowed configuration, wherein opening the retention apparatus to permit inflation of the cushion into the deployed configuration comprises permitting the cushion to unroll.

27. The method of claim 24, wherein the fastener comprises a hook-and-loop fastening strip, wherein the flexible member is constructed of a fabric having a napped side and an opposite side, wherein the hook-and-loop fastening strip is attached to the opposite side so that the flexible member can be rolled to fasten the hook-and-loop fastening strip to the napped side, wherein releasing the fastener from attachment with the flexible member comprises releasing the hook-and-loop fastening strip from attachment to the opposite side while permitting the hook-and-loop fastening strip to remain fastened to the napped side.

28. The method of claim 24, wherein the airbag module further comprises at least one additional retention apparatus, each of which comprises at least one additional flexible member and at least one additional fastener attached to the additional flexible member, wherein the additional fastener is fastened to attach the additional retention apparatus to the cushion to keep the cushion in the stowed configuration during normal vehicle operation, the method further comprising:
releasing each additional fastener from attachment with each additional flexible member to permit opening of each additional retention apparatus to permit inflation of the cushion into the deployed configuration.

29. A method for assembling an airbag module for protecting an occupant of a vehicle from impact, the airbag module comprising a retention apparatus and cushion having a lengthwise axis, the cushion having a deployed configuration in which the cushion is inflated to provide impact protection and a stowed configuration in which the cushion is compactly storable, the method comprising:
disposing the cushion in the stowed configuration;
wrapping the retention apparatus at least partially around the lengthwise axis of the cushion; and
attaching the retention apparatus to the cushion via an attachment mechanism such that the cushion is retained in the stowed configuration until inflation of the cushion, wherein the attachment mechanism has an attachment strength selected to permit the retention apparatus to open to permit inflation of the cushion to the deployed configuration, wherein attaching the retention apparatus to the cushion via the attachment mechanism comprises sewing the retention apparatus to form a sewn seam with a thread having a strength selected to permit breakage of the thread in response to entry of gas into the cushion.

30. The method of claim 29, wherein disposing the cushion in the stowed configuration comprises rolling the cushion.

31. The method of claim 29, wherein the retention apparatus comprises a flexible member having a first edge and a second edge, wherein wrapping the retention apparatus at least partially around the lengthwise axis comprises placing the cushion adjacent to the flexible member and extending the first and second edges around the cushion such that the first and second edges are disposed adjacent to each other.

32. The method of claim 31, wherein placing the cushion adjacent to the flexible member comprises placing the cushion on top of the flexible member, wherein extending the first and second edges around the cushion comprises rolling the cushion and the flexible member together.

33. The method of claim 29, wherein the retention apparatus comprises a flexible member and a fastener, wherein wrapping the retention apparatus at least partially around the lengthwise axis comprises disposing the flexible member to encircle at least part of the cushion, wherein attaching the retention apparatus to the cushion via the attachment mechanism comprises:
  attaching the fastener to the flexible member via the attachment mechanism; and
  fastening the fastener to the flexible member to keep the flexible member encircling at least part of the cushion.

34. The method of claim 33, wherein the fastener comprises a hook-and-loop fastening strip, wherein the flexible member is constructed of a fabric having a napped side and an opposite side, wherein attaching the fastener to the flexible member comprises attaching the hook-and-loop fastening strip to the opposite side, wherein fastening the fastener to the flexible member comprises pressing the hook-and-loop fastener against the napped side.

35. The method of claim 29, further comprising:
  wrapping at least one additional retention apparatus at least partially around the lengthwise axis; and
  attaching each additional retention apparatus to the cushion via at least one additional attachment mechanism to help retain the cushion in the stowed configuration until inflation of the cushion, wherein each additional attachment mechanism has an attachment strength selected to permit the additional retention apparatus to open to permit inflation of the cushion to the deployed configuration.

36. The method of claim 29, wherein the thread comprises a t-16 size, wherein sewing the retention apparatus to form the sewn comprises applying the thread in double needle lock fashion.

* * * * *